United States Patent
Johnson et al.

(10) Patent No.: US 7,504,154 B2
(45) Date of Patent: *Mar. 17, 2009

(54) MOISTURE BARRIER COATINGS FOR INFRARED SALT OPTICS

(75) Inventors: James Neil Johnson, Schenectady, NY (US); David Corbin Burton, Lady Lake, FL (US); Kevin Warner Flanagan, Albany, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/087,246

(22) Filed: Mar. 23, 2005

(65) Prior Publication Data

US 2006/0216470 A1    Sep. 28, 2006

(51) Int. Cl.
*B32B 27/06* (2006.01)
*B32B 27/30* (2006.01)
*B32B 27/38* (2006.01)
*B32B 7/10* (2006.01)
*B32B 18/00* (2006.01)

(52) U.S. Cl. .................. 428/417; 428/413; 428/441; 428/442; 428/522; 428/689; 428/697; 428/699; 428/704; 359/350; 359/355; 359/356; 359/507; 359/513; 359/514; 252/582; 252/584; 252/587; 501/27; 501/30; 501/108; 501/123; 501/151

(58) Field of Classification Search .................. None
See application file for complete search history.

(56) References Cited

U.S. PATENT DOCUMENTS

| | | | | |
|---|---|---|---|---|
| 3,866,045 A | * | 2/1975 | Ely et al. ................. | 250/331 |
| 4,038,201 A | * | 7/1977 | Hargreaves ............... | 252/584 |
| 4,514,437 A | * | 4/1985 | Nath ......................... | 427/566 |
| 4,678,275 A | * | 7/1987 | Ikedo et al. ............... | 385/142 |
| 4,712,886 A | * | 12/1987 | Mercado ................... | 359/796 |
| 4,721,360 A | * | 1/1988 | Murakami et al. ........ | 385/142 |
| 4,828,354 A | * | 5/1989 | Yoshida .................... | 385/142 |
| 5,309,543 A | * | 5/1994 | Artushenko et al. ...... | 385/142 |
| 5,352,493 A | * | 10/1994 | Dorfman et al. ........... | 427/530 |
| 5,502,015 A | * | 3/1996 | Shibata et al. ............. | 501/151 |
| 5,607,789 A | * | 3/1997 | Treger et al. ............... | 429/90 |
| 5,658,504 A | * | 8/1997 | Shibata et al. ............. | 264/1.23 |
| 5,681,666 A | * | 10/1997 | Treger et al. ............... | 429/90 |
| 5,690,863 A | * | 11/1997 | Schuman ................... | 252/582 |
| 6,441,956 B1 | * | 8/2002 | Perlo et al. ................. | 359/355 |
| 6,485,562 B1 | * | 11/2002 | Lisitsky et al. ............. | 117/3 |

(Continued)

FOREIGN PATENT DOCUMENTS

JP         56-089704 A    *    7/1981

(Continued)

*Primary Examiner*—Vivian Chen
(74) *Attorney, Agent, or Firm*—Scully, Scott, Murphy & Presser, P.C.

(57) ABSTRACT

The present invention is directed to a salt optic provided with a multilayer coating in order to improve upon the moisture resistance of a salt optic, when compared to the moisture resistance of an uncoated salt optic. In one aspect, the present invention is comprised of a coated salt optic having at least a first coating layer and a second coating layer, the first coating layer being surface-smoothing layer and adhesion layer, and the second coating layer being a moisture barrier layer.

5 Claims, 1 Drawing Sheet

U.S. PATENT DOCUMENTS

| | | | |
|---|---|---|---|
| 6,551,710 B1 * | 4/2003 | Chen et al. | 428/412 |
| 6,602,587 B2 * | 8/2003 | Macquart et al. | 428/216 |
| 6,657,196 B2 * | 12/2003 | Endo et al. | 250/339.11 |
| 6,844,070 B2 * | 1/2005 | Johnson et al. | 428/408 |
| 7,220,687 B2 * | 5/2007 | Won | 438/792 |
| 2004/0043218 A1 * | 3/2004 | Johnson et al. | 428/408 |
| 2006/0147739 A1 * | 7/2006 | Flanagan et al. | 428/522 |

FOREIGN PATENT DOCUMENTS

| | | | |
|---|---|---|---|
| JP | 61-072201 A | * | 4/1986 |
| JP | 62-262802 A | * | 11/1987 |
| JP | 07-181319 A | * | 7/1995 |
| WO | WO 96/23216 | * | 8/1996 |

* cited by examiner

MOISTURE BARRIER COATINGS FOR INFRARED SALT OPTICS

FIELD OF THE INVENTION

The present invention is directed to the field of optics, more specifically, it is directed to a coated salt optic that exhibits certain improvements in comparison to uncoated salt optics.

BACKGROUND OF THE INVENTION

The long-wave infrared region is the largest continuous IR transmittance window in the Earth's atmosphere. Military aircraft, for example, use the IR communication window via known communication devices having IR sensors. One of the components involved in IR sensors is a primary lens.

An IR primary lens is an IR transmissive structure. An IR transmissive structure transmits IR energy of wavelengths between about 0.1 microns and 20 microns, preferably between 1 and 15 microns, and most preferably between 2 and 12 microns. One material that exhibits IR transmissive characteristics and is commonly used as an IR lens is germanium. Germanium is a suitable material because it has a singular, or binary crystalline structure that is essentially transparent in the IR spectrum.

The shape of the IR primary lens can be aspheric. The parabolic shape of an aspheric lens is ideal for manipulating the focal point of the IR energy waves. Aspheric germanium lenses are normally manufactured by diamond point turning, a very costly and time consuming process.

Salt optics, such as those derived from alkali halides, have the potential of exhibiting improved optical performance over conventional infrared optical materials, such as silicon, germanium, and other materials. Improved performance may include, but is not limited to: increased transmittance, low temperature moldability, reduced cost, and a lower refractive index, which relaxes the requirements for antireflective coatings. However, salt optics are susceptible to degradation when exposed to moisture. For instance, the useful life of the optic may be shortened via exposure to an environment containing an elevated level of moisture, such as an environment with high humidity.

More specifically, most types of salts, when left exposed in high-moisture environments (i.e. those of about >30% relative humidity) erode rapidly. This may result in degraded optical performance or failure. Thus, while salt optics transmit infrared wavelengths over a range of about 0.2 microns to >20 microns, they must presently be employed in moisture controlled environments.

SUMMARY OF THE INVENTION

The present invention is directed to a salt optic provided with a multilayer coating in order to improve upon the moisture resistance of a salt optic, when compared to the moisture resistance of an uncoated salt optic. In one aspect, the present invention is comprised of a coated salt optic having at least a first coating layer and a second coating layer, the first coating layer being surface-smoothing layer and adhesion layer, and the second coating layer being a moisture barrier layer. Additional layers of coating may form part of the coated salt optic, such as for instance, additional layers of the materials employed first and second coating layer, and/or additional layers of other materials.

In a specific embodiment, the salt optic is a potassium bromide (KBr) material, or other salt optics such as BaF2, CaF2, CsBr, CsI, LaF3, LiF, MgF2, KCl, KI, RbBr, RbCl, RbI, AgBr, AgCl, NaCl, NaF, NaI, SrF2, TlBr, TlBr—TlCl, TlBr—TlI, or TlCl.

In another specific embodiment, the first surface smoothing/adhesive coating layer is selected from among plasma polymerized methacrylate, an amorphous hydrogenated carbon, and other acrylates. In another specific embodiment, the second moisture barrier layer can be amorphous hydrogenated germanium carbon ($\alpha$-GeC$_x$:H) where x is between 0.1 and 0.4, or silicon nitride.

Salt optics, when coated in accordance with the present invention, can be employed in relatively high moisture containing environments, such as high humidity environments. Thus, a salt optic can be produced that can operate in both the visible and infrared portions of the spectrum that can withstand the aforementioned adverse conditions.

DETAILED DESCRIPTION OF THE INVENTION

Figure 1:
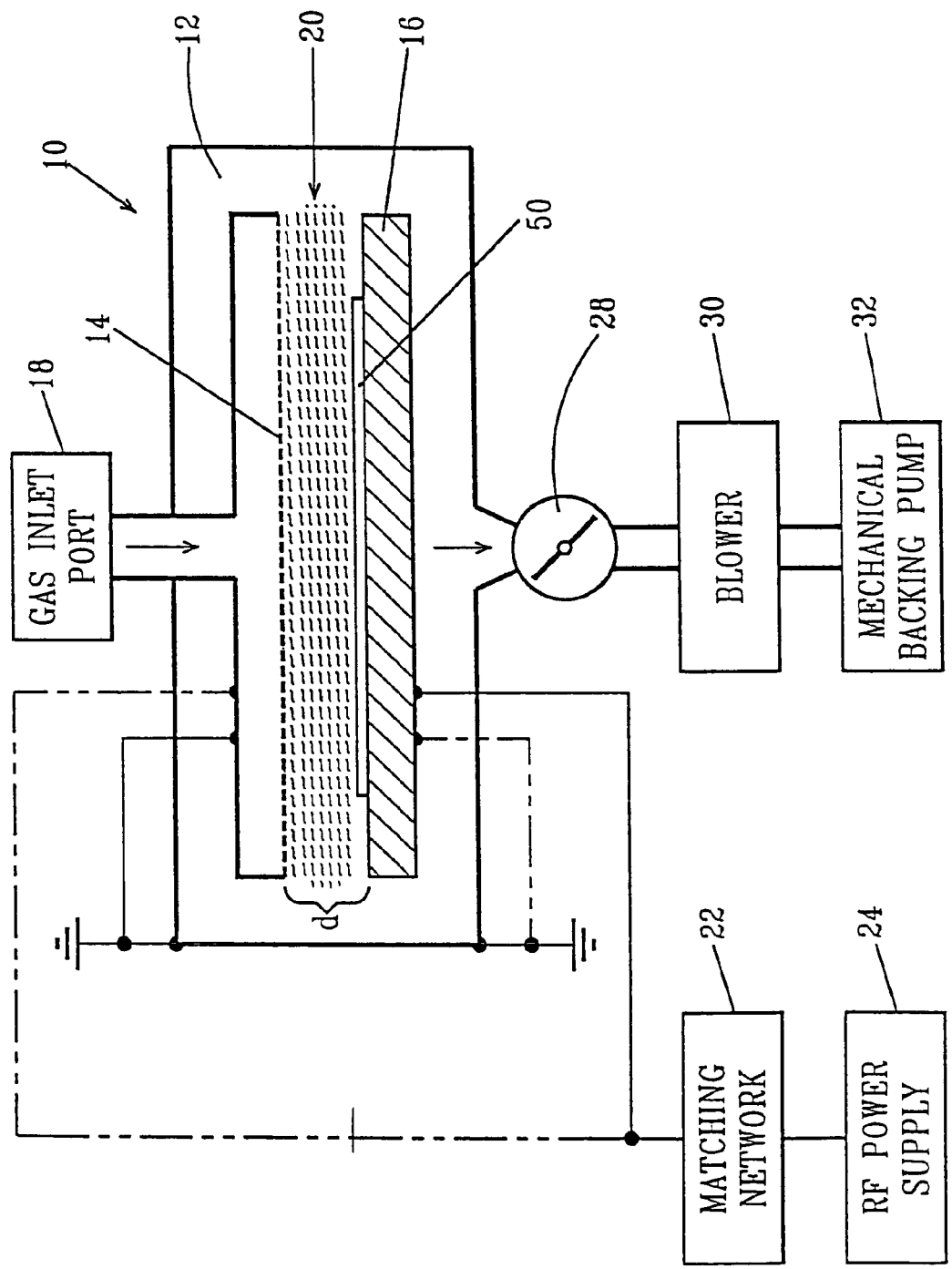
FIG. 1 is a schematic cross-sectional view of a parallel plate plasma reactor that can be employed in the present invention.

The first coating layer, which is an organic adhesion smoothing layer, adheres to the surface of the optic, filling in defects to provide a planar surface for inorganic barrier film deposition. Possible candidates for the first coating layer include, but are not limited to: epoxies, plasma polymerized methyl acrylate and amorphous hydrogenated carbon, which can be deposited by PECVD, spincoating, dipcoating, or other wet coating processes. Any acrylate or other suitable monomer that can be cured by heat, UV, etc. could be used in the wet coating approach. PECVD is advantageous since this method makes producing multilayer barriers much easier.

PECVD deposition of methyl acrylate has been found to provide a good base for the adhesion of subsequently deposited layers. While a capacitively coupled parallel plate RF unit may be used, MW frequency plasma sources, inductively coupled plasma sources, and expanding thermal plasmas are some other examples of plasma sources that can be used for PECVD.

The second coating layer, which is the barrier layer, provides a diffusion barrier to moisture. Candidates for this layer include but are not limited to: amorphous hydrogenated germanium carbon, and silicon nitride. The barrier layers are deposited any one of PECVD, sputtering, e-beam evaporation, sol-gel chemistry, or other physical vapor deposition (PVD), chemical vapor deposition (CVD), or wet chemical coating techniques providing coatings with the desired characteristics. Examples of plasma sources that can be used for PECVD include a capacitively coupled parallel plate RF unit, MW frequency plasma sources, inductively coupled plasma sources, and expanding thermal plasma sources.

FIG. 1 shows a schematic cross-sectional view of a parallel plate plasma reactor that can be employed in the present invention. Parallel plate plasma reactor 10 includes reactor chamber 12, RF power supply 24, matching network 22, gas inlet port 18, throttle valve 28, blower 30 and mechanical pump 32. Reactor chamber 12 contains the plasma during the deposition process. A RF power supply provides input power for plasma ignition and continuance, while the matching network matches the output impedance of the power supply to the input impedance of the plasma/reactor configuration. The gas inlet port is used to introduce the gas mixture into the reactor chamber. An automated throttle valve maintains the required pressure during deposition. A roots blower and mechanical backing pump are arranged in tandem to provide the necessary vacuum level to allow for low-pressure deposition.

Top (or showerhead) electrode 14 and bottom electrode 16 are positioned inside reactor chamber 12. IR transmissive material 50 such as a KBr salt optic material, may be positioned on either of these electrodes, with the configuration shown in FIG. 1, i.e., IR transmissive material 50, atop bottom electrode 16, being preferred. In accordance with the present invention, the top electrode is separated from the bottom electrode by a distance, d, which is from about 1.00 to about 3.00 inches, with a separation distance of from about 1.25 to about 1.50 inches being preferred. The showerhead electrode includes holes (represented by dotted lines in FIG. 1), which permit gas flow from gas inlet port 18 into reactor chamber 12. The gas exits the reactor chamber when throttle value 28 is switched to an open position. The arrows in the reactor chamber represent the directional flow of the gas mixture.

As shown, the showerhead electrode is coupled to ground, while bottom electrode 16 is connected to RF power source 24. In such an embodiment, the bottom electrode acquires a negative bias, whose value is dependent on the reactor geometry and plasma parameters. Alternatively, the top electrode can be connected to the RF power supply (not shown) and the bottom electrode is coupled to ground. In this alternative embodiment, the top electrode acquires the negative bias. The RF power supply can work continuously throughout the entire deposition process or it can be pulsed during the deposition process.

By preselecting the thickness of each layer in the coating to determine values, and also selecting layer materials with certain refractive indices, anti-reflective coatings and/or protective coatings can be fabricated. This can be used to decrease reflection losses from the surface of the salt optic.

During operation, a region of plasma 20 comprising the gas mixture is formed between the showerhead electrode and the IR transmissive material. Process variables controlled during the deposition of the first and second coating layers include RF frequency, reactant gas mixtures and flow rates, pressure in the reactor and substrate temperature. Specifically, the coating layers of the present invention are deposited using an alternating frequency of from about 20 kHz to about 2.45 GHz, with an alternating frequency of from about 13.56 MHz to about 2.45 GHz being preferred. The pressure in the reactor at the time of deposition is from about 20 to about 600 mtorr, with a pressure of from about 150 mtorr to about 250 mtorr being preferred.

The temperature of the substrate upon which the plasma comprised of the starting materials is deposited is maintained at a temperature that the person of ordinary skill in the art would recognize as suited for effecting deposition. A person of ordinary skill in the art would recognize that deposition at relatively low temperatures is a characteristic of PECVD processes per se. The substrate temperature can be maintained at the low-temperature ranges described above by using a liquid recirculator (not shown in FIG. 1), which is positioned adjacent to the reactor.

The precursors used in forming the first coating layer include a (1) methyl acrylate and other acrylates, or methane, (2) optionally hydrogen, and (3) an inert gas such as He, Ne, Ar, or a mixture of inerts. These precursors (i.e., methyl acrylate, inert gas, and optionally hydrogen) are mixed together prior to entering the reactor chamber.

The gas precursors used in forming the second coating layer include (1)(a) for amorphous hydrogenated germanium carbon ($\alpha$-GeC$_x$:H), tetramethyl germanium and methane; (b) for silicon nitride, silane and NH$_3$ (2) optionally hydrogen, and (3) an inert gas such as He, Ne, Ar, or a mixture of inerts. These gases (i.e., methyl acrylate, inert gas, and optionally hydrogen) are mixed together prior to entering the reactor chamber.

In accordance with the present invention, the gas mixture employed in the formation of coatings, by mass flow in standard cubic centimeters per minute (sccm), range from about 50 to about 300 sccm methyl acrylate source, from about 0 to about 50 sccm hydrogen, and from 25 to about 100 sccm inert gas. More preferably, the gas mixture employed in the present invention comprises from about 150 to about 200 sccm active material, from about 10 to about 25 sccm hydrogen, and from about 25 to about 75 sccm inert gas.

The deposition rate of the coatings onto the IR transmissive material may vary depending on the conditions used to deposit them. The thickness of the coatings formed in the present invention may vary depending on the exact deposition conditions employed. Typically, however, the coatings of the present invention have a deposited thickness of from about 0.02 to about 5 micron, with a deposited thickness of from about 0.03 to about 1 micron being more highly preferred.

The coatings of the present invention are characterized as being IR transmissive, i.e., capable of transmitting IR energy of wavelengths of from about 0.1 to about 20 microns, preferably from about 1 to about 15 microns and most preferably from about 2 to about 12 microns. Additionally, the coatings have sufficient adhesive properties with the underlying IR transmissive material; hence the coating layers and in particular the first layer (such as the methyl acrylate film) does not delaminate from the IR transmissive material, and further exhibit good adhesion to an overlayer applied on top of the first coating layer, such as an $\alpha$-GeC$_x$:H film that may be applied as a moisture barrier layer.

We claim:

1. A moisture resistant salt optic exhibiting transmissance of energy in the infrared range, comprised of:
    (a) a salt optic coated with a first adhesion layer; and
    (b) a second barrier layer consisting essentially of amorphous hydrogenated germanium carbon.

2. The moisture resistant salt optic of claim 1 wherein the first adhesion layer is selected from the group consisting of: plasma polymerized methacrylate, UV-cured epoxy, and amorphous hydrogenated carbon.

3. The moisture resistant salt optic of claim 1 wherein the salt optic is BaF2, CaF2, CsBr, CsI, LaF3, LiF, MgF2, KLBr, KCl, RI, RbBr, RbCl, RIM, AgBr, AgGI, NaCl, NaF, NaI, SrF2, TlBr, TlBr-TlCl, TlBr-TlI, or TlCl.

4. The moisture resistant salt optic of claim 3 wherein the first adhesion layer is selected from the group consisting of: plasma polymerized methacrylate, UV-cured epoxy, and amorphous hydrogenated carbon.

5. The moisture resistant salt optic of claim 1 further comprised of a plurality of alternating first adhesion layers and second barrier layers.

* * * * *